(12) United States Patent
Exner et al.

(10) Patent No.: US 7,094,265 B2
(45) Date of Patent: Aug. 22, 2006

(54) CLEANING DEVICE FOR A BUNDLE OF TUBULAR FILTER ELEMENTS DESIGNED WITH ONE END OPEN, PREFERABLY OF AN INDUSTRIAL DUST FILTER

(75) Inventors: Markus Exner, Ratingen (DE); Rainer Krabs, Sprockhovel (DE)

(73) Assignee: Intesiv-filter GmbH & Co. KG, (DE)

( * ) Notice: Subject to any disclaimer, the term of this patent is extended or adjusted under 35 U.S.C. 154(b) by 68 days.

(21) Appl. No.: 10/841,223

(22) Filed: May 7, 2004

(65) Prior Publication Data
US 2005/0155333 A1 Jul. 21, 2005

(30) Foreign Application Priority Data
May 8, 2003 (DE) ................................ 103 20 486

(51) Int. Cl.
*B01D 46/04* (2006.01)
(52) U.S. Cl. ........................ 55/302; 55/283; 55/303; 55/341.1; 55/293; 95/279; 95/280; 95/281
(58) Field of Classification Search ............. 55/283, 55/302, 303, 341.1, 293; 95/280, 281, 279
See application file for complete search history.

(56) References Cited

U.S. PATENT DOCUMENTS

| | | | |
|---|---|---|---|
| 4,264,345 A * | 4/1981 | Miller | 55/341.1 |
| 4,445,913 A * | 5/1984 | Nishiyama | 55/302 |
| 4,504,293 A | 3/1985 | Gillinghame et al. | |
| 5,616,171 A * | 4/1997 | Barris et al. | 95/280 |
| 6,022,388 A * | 2/2000 | Andersson et al. | 55/302 |
| 6,149,716 A * | 11/2000 | Bach et al. | 95/280 |
| 2004/0035091 A1* | 2/2004 | Wang | 55/283 |

FOREIGN PATENT DOCUMENTS

| | | |
|---|---|---|
| DE | 36 18 020 | 12/1987 |
| DE | 444 02 79 | 6/1995 |
| DE | 196 18 377 | 11/1996 |
| EP | 0 357 931 | 3/1990 |
| EP | 1 029 576 | 8/2000 |

* cited by examiner

*Primary Examiner*—Minh-Chau T. Pham
(74) *Attorney, Agent, or Firm*—Robert W Becker & Associates; Robert W Becker

(57) ABSTRACT

A cleaning device for a bundle of tubular filter elements designed with one end open, preferably of an industrial dust filter, is proposed. Injectors for delivery of a pulse-like compressed-air jet into the filter elements are arranged above the openings of the filter elements. The compressed-air supply of the injectors, controlled via valves, takes place via a number of nozzle tubes extending at right angles to the injectors, and a number of injectors are connected in a row to each nozzle tube. Only some of the nozzle tubes are connected directly to valves and these nozzle tubes extend to a deflection, from which at least one further nozzle tube closed at its end extends in the opposite direction. The deflection is preferably at the same time a branching from which two nozzle tubes extend, which are located on the two sides of the centrally arranged nozzle tube.

6 Claims, 1 Drawing Sheet

CLEANING DEVICE FOR A BUNDLE OF TUBULAR FILTER ELEMENTS DESIGNED WITH ONE END OPEN, PREFERABLY OF AN INDUSTRIAL DUST FILTER

BACKGROUND OF THE INVENTION

The invention relates to a cleaning device for a bundle of tubular filter elements designed with one end open, preferably of an industrial dust filter, with injectors for delivery of a pulse-like compressed-air jet into the filter elements arranged opposite the openings of the filter elements, the compressed-air supply of the injectors, controlled via valves, taking place via a number of nozzle tubes extending at right angles to the injectors, and a number of injectors being connected in a row to each nozzle tube.

Such cleaning devices are used chiefly in industrial dust filters, as known from, for example, DE 44 40 279 A1. Filter elements such as e.g. filtering bags, fibrous filters or filtering tubes are distributed uniformly over the surface of a partition which separates the dusty-air space of the filter from its clean-air space. The filter elements project under their own weight into the dusty-air space arranged below, so that the dust-containing air flows through them from outside to inside. The filter elements are open at their upper end, so that they communicate with the clean-air space which is arranged above the partition and is operated at a lower pressure in relation to the dusty-air space.

Such filter elements have to be cleaned at intervals, as they become clogged from outside after a certain period of operation. A commonly used cleaning system consists in, in a reversal of the filtration direction, blowing compressed air in a pulse-like manner into the filter elements from the openings, as a result of which the dust or filter cake adhering on the outside can fly off and falls into a collecting unit arranged below the filter elements.

Especially great demands are made on the regeneration of the filter surfaces when the filter is used in production facilities with frequently changing products. In the case of such use of the filter, it is necessary to clean the entire dusty-air space including the filter elements thoroughly, in order that no product adulteration or product contamination can occur when a product change takes place. Such hygienically appropriate operation is essential above all in the processing of foods or pharmaceutical or medical products.

For generating the compressed-air pulse, injectors are arranged above the filter elements. As a rule, a number of injectors arranged in a row are supplied with the compressed air necessary for the cleaning operation via a common nozzle tube. The nozzle tube serving as a distributor can be connected to a compressed-air reservoir via a rapidly operable valve. By abrupt opening of the valve, compressed air passes into the nozzle tube and, via the injectors attached to the latter, into the filter elements from above. The control technology requirement associated with this is relatively great because, while a number of injectors are connected to the valve-controlled nozzle tube and can thus be operated simultaneously, each nozzle tube nevertheless has to be connected to the pressure reservoir via its own valve. The possibility of connecting all the nozzle tubes, which as a rule run parallel to one another, to a single, common valve and in this way reducing the control technology requirement, is rather of a theoretical nature. In practice, it turns out that, in this way, uniformly distributed pulse strength cannot be achieved in all injectors. Rather there is a risk that some injectors operate with higher pulse strength and other injectors with relatively lower pulse strength, which is not acceptable for uniform de-dusting of a filter.

The object of the invention is to produce a cleaning device for a bundle of tubular filter elements designed with one end open, which cleaning device works with a low control technology requirement and is to operate with uniformly distributed pulse strength of the injectors.

SUMMARY OF THE INVENTION

To achieve this object, it is proposed, in a cleaning device with the features mentioned in the introduction, that only some of the nozzle tubes are connected directly to valves and these nozzle tubes extend to a deflection, from which at least one further nozzle tube closed at its end extends in the opposite direction.

According to the invention, at least two nozzle tube runs can therefore be operated with a single valve. In this connection, it has been found that, contrary to the assumption that deflection of the flow of the compressed air would lead to a noticeable pressure drop, the injectors along both the outward run and the return run, which is closed at its end, operate with uniformly distributed pulse strength.

It has furthermore been found that no disadvantages with regard to the desired uniformly distributed pulse strength of the injectors arise either when the deflection is developed into a branching with an outward run and a number of return runs. It is therefore proposed with a particularly advantageous development of the invention that the deflection is at the same time a branching, from which two nozzle tubes extend in the opposite direction to the nozzle tube connected directly to the valve.

This branching is preferably symmetrical in such a way that the nozzle tubes extending in the opposite direction are located on the two sides of the nozzle tube connected directly to the valve. In this system of nozzle tubes, the outward run is therefore located between and preferably centrally between the return runs.

In an advantageous constructional development, the nozzle tube connected directly to the valve ends in a T-piece, from the two branches of which tube bends lead to the start of the nozzle tubes extending in the opposite direction, i.e. of the nozzle tubes of the return run.

Finally, it is proposed with a development of the cleaning device that the cross sections of all nozzle tubes are the same, preferably the tube cross sections in the region of the deflection or branching as well.

BRIEF DESCRIPTION OF THE DRAWINGS

The invention is explained in greater detail below with reference to an illustrative embodiment. In the associated drawing.

DESCRIPTION OF SPECIFIC EMBODIMENTS

Figure 1:
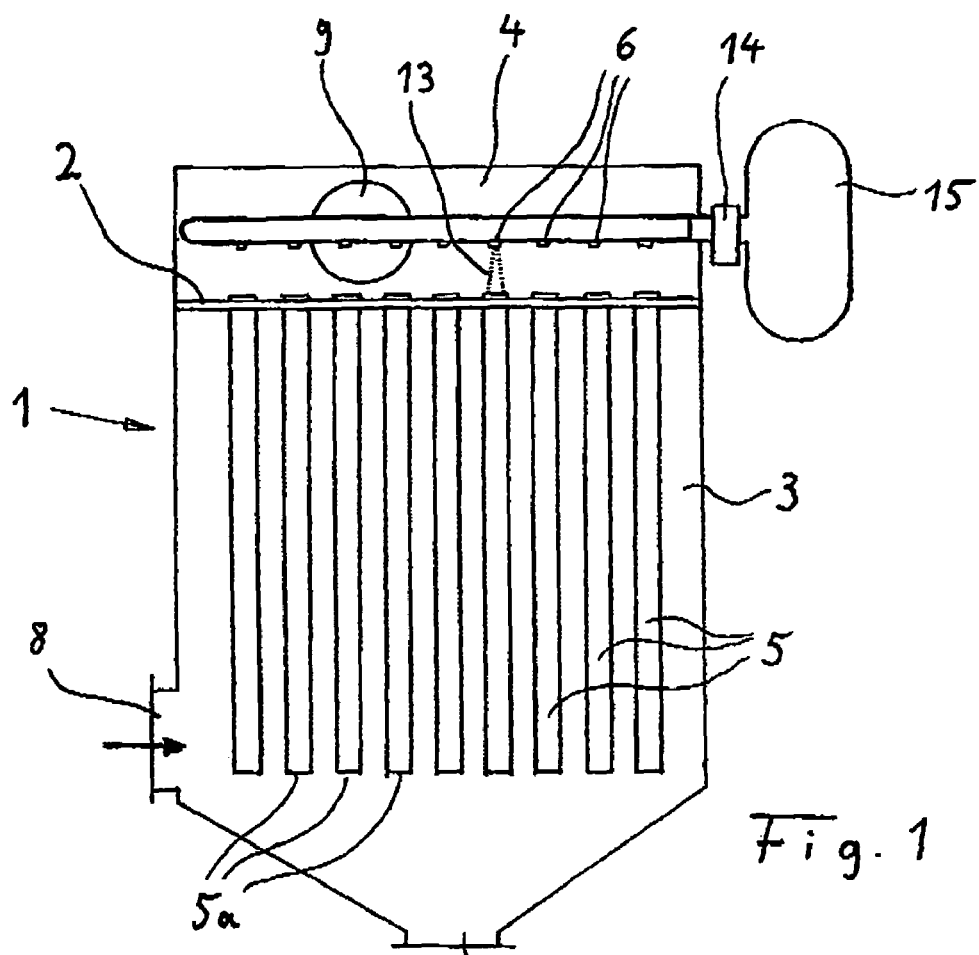
FIG. 1 shows in detail a sectional illustration of an industrial dust filter with a cleaning device arranged in its upper part.

FIG. 1 shows a sectional overall illustration of an industrial dust filter. The dust filter comprises a vertically aligned, preferably cylindrical filter housing 1, which is divided into a dusty-gas space 3 lying below and a clean-gas space 4 lying above by a horizontal partition 2. The partition 2 is shaped similarly to a tube plate and has a plurality of openings for elongate filter elements 5 inserted therein. The filter elements illustrated are filtering tubes which are closed at their lower end at 5a and open at their upper end. The filter elements 5 are suspended in the openings of the partition 2 from above, being supported on the upper side of the partition. The active filter surface is formed by the lateral surface of the preferably cylindrically shaped filter elements 5. In each case a number of filter elements 5 of the filtering tube bundle can also be arranged in such a way that they form a part group in the form of a filter pack.

The dust-containing gas enters the filter via an inlet 8 of the filter housing. For cleaning and thus regenerating the individual filter elements 5 of the filtering tube bundle, injectors 6 of a pressure pulse injector system are located above their openings. A powerful air jet is delivered briefly via the injectors 6 from above into the openings of the filter elements 5, so that the filter elements are cleaned of the dust or the dust-containing product filtered out on their outer surfaces. The dust collects in the lower part of the filter housing 1, for which reason a dust discharge 7 is arranged there. The cleaned gas leaves again at 9.

The injectors 6 are located on the underside of the lateral surface of nozzle tubes 10, 11, 12. In a very simple development, the nozzle tubes 10, 11, 12 are to this end provided with corresponding openings, i.e. nozzles, which are in each case aligned exactly with the filter element 5 arranged below and in this way serve as injectors. However, the injectors can also be additional components which are fastened to the nozzle tubes. In the drawing, reference number 13 illustrates a compressed-air pulse emerging from an injector 6 and directed towards the respective filter element. The nozzle tubes 10, 11, 12 can be connected to a compressed-air reservoir 15 via valves 14. If the respective valve 14 opens, compressed air passes abruptly via the nozzle tube to its injectors 6.

Figure 2:
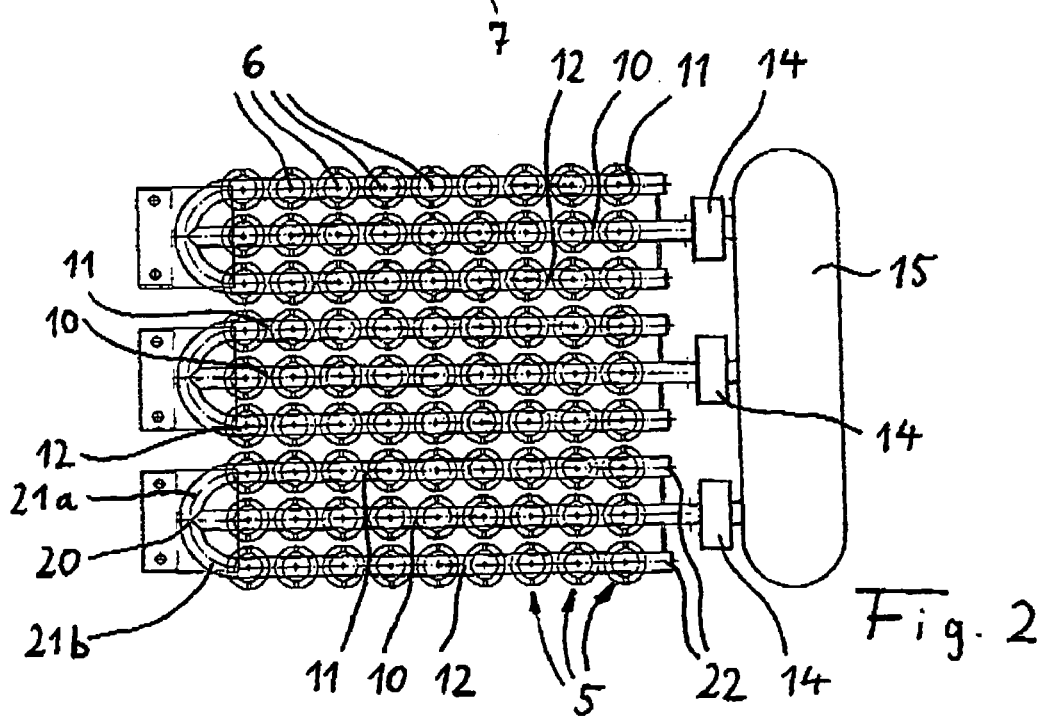
FIG. 2 shows in detail a top view of the cleaning device consisting of a compressed-air reservoir, valves and a system of nozzle tubes.

As a top view of the system of nozzle tubes, FIG. 2 shows that a plurality of such nozzle tubes 10, 11, 12 are present, preferably extending parallel to one another. Each of the nozzle tubes 10, 11, 12 has nine injector openings altogether on its underside. In the illustrative embodiment, the number of nozzle tubes 10, 11, 12 is also nine. In this connection, the nozzle tubes are combined in three groups altogether. Each group in turn comprises a centrally arranged nozzle tube 10 and two nozzle tubes 11 and 12 arranged on the two sides. As FIG. 2 also shows, only the central nozzle tube is connected directly to the respective valve 14 of the group. At its other, in FIG. 2 left, end, the centrally arranged nozzle tube 10 ends in a T-piece 20. From one branch of the T-piece 20, a first tube bend 21a leads in a quadrant to the nozzle tube 11, and from the other branch of the T-piece 20, a second tube bend 21b leads in a quadrant to the nozzle tube 12. As a whole, the T-piece 20 and the two quadrant bends 21a, 21b therefore form a flow deflection with simultaneous branching. From the end of the central nozzle tube 10, the compressed air passes into the two other nozzle tubes 11, 12 which in flow terms therefore extend in the opposite direction to the nozzle tube 10. After the valve 14 has been opened, the compressed air therefore flows in one direction along the central nozzle tube 10 and in the opposite direction through the two other nozzle tubes 11, 12. The two other nozzle tubes 11, 12 are closed at their ends 22 close to the valve 14.

The cross sections of all nozzle tubes, i.e. both the nozzle tube 10 of the outward run and the nozzle tubes 11, 12 of the return run, are the same, which reduces production costs and in particular simplifies connection of the tubes in the region of the T-piece 20.

The three valves 14 can be operated together or, as may be more advantageous, one after another. In the illustrative embodiment, the nozzle tube 10 connected directly to the valve 14 branches into two further nozzle tubes 11, 12. In the same way, greater branching is also possible, e.g. from one nozzle tube of the outward run into altogether four nozzle tubes of the return run.

The specification incorporates by reference the disclosure of German priority document 103 20 486.5 filed May 8, 2003.

The present invention is, of course, in no way restricted to the specific disclosure of the specification and drawings, but also encompasses any modifications within the scope of the appended claims.

The invention claimed is:

1. A cleaning device for a plurality of tubular filter elements each having an open end, comprising:
    at least one first nozzle tube, wherein said at least one first nozzle tube is connected directly to a valve of a compressed-air supply;
    at least one further nozzle tube connected to an end of said at least one first nozzle tube remote from said valve via a connector, wherein said at least one further nozzle tube extends substantially parallel to said at least one first nozzle tube and has a closed end remote from said connector; and
    a plurality of respective injectors connected in a row, and having a discharge disposed at substantially right angles, to each of said at least one first nozzle tube and at least one further nozzle tube for receiving compressed air therefrom, wherein said injectors are disposed across from, and serve for a delivery of a compressed-air pulse to, said open end of said filter elements.

2. A cleaning device according to claim 1, wherein said connector is in the form of a branching, from which two further nozzle tubes extend.

3. A cleaning device according to claim 2, wherein said branching is symmetrically disposed relative to said at least one first nozzle tube such that said further nozzle tubes are disposed on opposite sides of said at least one first nozzle tube.

4. A cleaning device according to claim 3, wherein said connector is in the form of a T-piece from which branch off two tube bends, each of which is connected to a respective one of said further nozzle tubes at an end thereof opposite said closed end thereof.

5. A cleaning device according to claim 1, wherein said first nozzle tubes and said further nozzle tubes all have the same cross-sectional configuration.

6. A cleaning device according to claim 1, wherein said injectors are formed by openings in lateral surfaces of said at least one first nozzle tube and said at least one further nozzle tube.

* * * * *

UNITED STATES PATENT AND TRADEMARK OFFICE
CERTIFICATE OF CORRECTION

PATENT NO.        : 7,094,265 B2
APPLICATION NO. : 10/841223
DATED             : August 22, 2006
INVENTOR(S)       : Exner et al.

It is certified that error appears in the above-identified patent and that said Letters Patent is hereby corrected as shown below:

<u>Title page,</u>
Item [73] should read as follows:

[73] Assignee: Intensiv-filter GmbH & Co. KG

Signed and Sealed this

Fourteenth Day of November, 2006

JON W. DUDAS
*Director of the United States Patent and Trademark Office*